United States Patent
Föhl

[11] Patent Number: 5,149,128
[45] Date of Patent: Sep. 22, 1992

[54] CONTROL MECHANISM FOR PRETENSIONERS IN VEHICLES

[75] Inventor: Artur Föhl, Schorndorf, Fed. Rep. of Germany

[73] Assignee: TRW Repa GmbH, Alfdorf, Fed. Rep. of Germany

[21] Appl. No.: 686,156

[22] Filed: Apr. 16, 1991

[30] Foreign Application Priority Data

Apr. 17, 1990 [EP] European Pat. Off. ........ 90107273.6

[51] Int. Cl.⁵ .............................................. B60R 21/32
[52] U.S. Cl. .................................... 280/734; 280/806; 73/514; 180/282
[58] Field of Search ................... 73/514; 242/107.8 R, 242/107.4 A, 107.4 B; 200/61.45 R, 61.52, 61.53, 61.46, 61.48, 61.49, 61.5; 280/806, 734, 735; 180/282

[56] References Cited

U.S. PATENT DOCUMENTS

| | | | |
|---|---|---|---|
| 2,267,295 | 12/1941 | Balton | 221/135 |
| 2,979,582 | 4/1961 | Weaver | 200/61.45 R |
| 3,240,510 | 3/1966 | Spouge | 280/806 |
| 4,513,629 | 4/1985 | Keller et al. | 200/61.45 R |
| 4,747,562 | 5/1988 | Tsukamoto et al. | 242/107.4 A |
| 4,999,004 | 3/1991 | Skanberg et al. | 280/806 |

Primary Examiner—H. Grant Skaggs
Attorney, Agent, or Firm—Tarolli, Sundheim, & Covell

[57] ABSTRACT

For controlling a pretensioner of a gas-bag restraining system in vehicles a vehicle-sensitive inertia mass is pivotally mounted in a housing. A strike piece pivotally mounted in the housing and spring-loaded in the direction of a firing pin bears via a roller mounted easily movably thereon on a cam face of the inertia mass. The configuration of the cam face, the path of movement of the roller on a pivot movement of the spring-loaded strike piece and the direction of movement of the inertia mass are adapted to each other in such a manner that the triggering criteria of an electronic trigger circuit integrating the deceleration values above a predetermined threshold with respect to time are simulated. By employing rolling bearings and by the hermetic sealing of the housing the triggering parameters remain unchanged for a long time.

3 Claims, 3 Drawing Sheets

CONTROL MECHANISM FOR PRETENSIONERS IN VEHICLES

The invention relates to a control mechanism for pretensioners in a safety belt restraining system or for gas-bag restraining systems in motor vehicles.

For controlling the action of a pretensioner in a safety belt restraining system or of a gas-bag restraining system in vehicles a release or trigger device is required. Particularly efficient are electrical control systems which include complicated electronics and evaluate the vehicle deceleration. The deceleration values occurring in a vehicle in a collision may be very different, depending on the vehicle type. Each vehicle has its own "crash curve" which represents the profile of the deceleration values with time. To prevent unintentional triggering, only deceleration values which exceed a predetermined threshold value of for example 4 g are taken into account. Momentary deceleration peaks which can occur through jolts or the like must not lead to triggering. For this reason, the deceleration values measured are integrated over time. The release takes place only at a predetermined value of the integral, which may be different from vehicle to vehicle. By means of electronic circuits it is possible without any difficulty to effect the triggering exactly at a certain value of the integral. Also, no difficulty is involved in adapting the triggering criteria of a given electronic circuit to different circumstances or vehicle types.

However, for each electrically controlled tightening system or gas-bag restraining system a separate electrical control line is required and this leads to considerable material and assembly expenditure.

Mechanical control systems which can be associated individually as regards spatial arrangement and function with each tightening means or each gas-bag restraining system are favourable as regards costs. However, the conventional mechanical control systems are very difficult to manage as regards their triggering criteria and can hardly be adapted in reliably reproduceable manner or with adequate long-time stability to the particular use conditions.

The invention provides a control or activating mechanism for pretensioners in a safety belt restraining system or for gas-bag restraining systems in motor vehicles, which has control criteria which can be adjusted accurately and with long-time reproduceability.

This is achieved with a control mechanism wherein a release member is pivotally mounted with low friction in a housing. An inertia mass is pivotally mounted with low friction in the housing. The release member bears via a roller mounted easily movably thereon on a concave cam face on the inertia mass. The housing is hermetically sealed. Preferably, in the interior of the housing, a moisture-absorbing hygroscopic substance is arranged. The invention proceeds from the idea that the triggering criteria for the drive mechanism can be adjusted by the configuration given to the cam face. A sensitive sensing of the cam face by the roller is achieved in that said roller is mounted easily movably on the release member, in particular by means of a rolling bearing. The inertia mass and the release member are also preferably mounted easily movably on a rolling bearing. Now, to ensure that the precise and easily moving mounting of these functional parts is maintained even for long periods of ten years and more, the housing is hermetically sealed towards the outside. Furthermore, in the interior of the housing a hygroscopic substance is arranged which prevents any accumulation of moisture in the housing and thus also prevents corrosion.

According to an advantageous further development of the invention, the shape of the cam face, the movement path of the roller in the pivot movement of the spring-loaded release member and the direction of movement of the inertia mass are adapted to each other in such a manner that the release member is held in a stable readiness position spaced from the drive element as long as no deceleration forces exceeding a predetermined value occur at the inertia mass;

the roller rolls on the cam face of the inertia mass oppositely to the spring action on the release member when deceleration forces exceeding the predetermined value occur at the inertia mass, and when the deceleration forces decrease the release member returns to its stable readiness position in that the roller rolls on the cam face in the opposite direction; and under the action of deceleration forces at the inertia mass having a magnitude exceeding the predetermined value and an integral with respect to time giving a predetermined velocity loss, the roller on the cam face overcomes a point beyond which an over-center effect occurs by which the inertia mass suddenly disengages the release member for actuation of the pretensioner or gas bag.

If this embodiment of the drive mechanism is compared with an electronic release or triggering system, the predetermined value of the deceleration forces corresponds to the threshold beyond which integration starts in an electronic system. An electronic system calculates the trigger instant from the predetermined velocity loss and the deceleration occurring. The predetermined deceleration value and the predetermined velocity loss can be defined solely by the configuration of the cam face. At its one end the cam face preferably has an end limitation against which the roller of the release member bears in the readiness position. This end limit is preferably followed by a first portion of the curve surface or cam face on which the roller under the influence of deceleration forces occurring at the inertia mass must overcome a resistance corresponding to the predetermined value for the roller to be able to move further on the following portion of the cam face. This following portion of the cam face is distinguished in that the roller moves further only under the influence of deceleration forces exceeding the predetermined value, but under deceleration forces exceeding the predetermined value, but under deceleration forces dropping therebelow, rolls back in the direction of its readiness position. The steepness of this portion of the cam face is small and so dimensioned that the roller rolls further against almost constant or gradually increasing resistance and under decreasing deceleration forces rolls back on the cam face. It is only when the end of this portion of the cam face is reached that an over-center effect arises which is achieved in practical embodiments in that the cam face terminates with an abrupt rearward jump.

An almost constant resistance against which the roller further moves on the cam face is achieved in embodiments with a pivotal drive element by a cam face corresponding to an archimedian spiral of small pitch.

Further features and advantages of the invention will be apparent from the following description of several embodiments and from the drawings, to which reference is made and in which.

Figure 1:
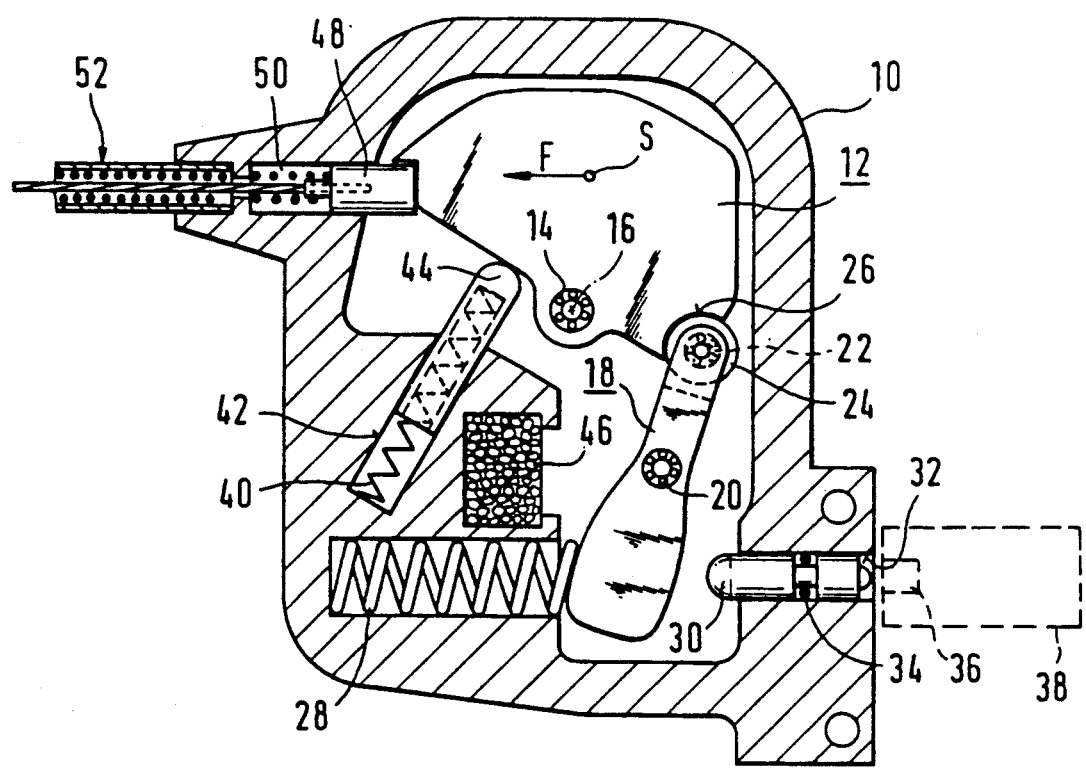
FIG. 1 is a schematic section of a first embodiment of the control mechanism in the readiness state.
Figure 2:
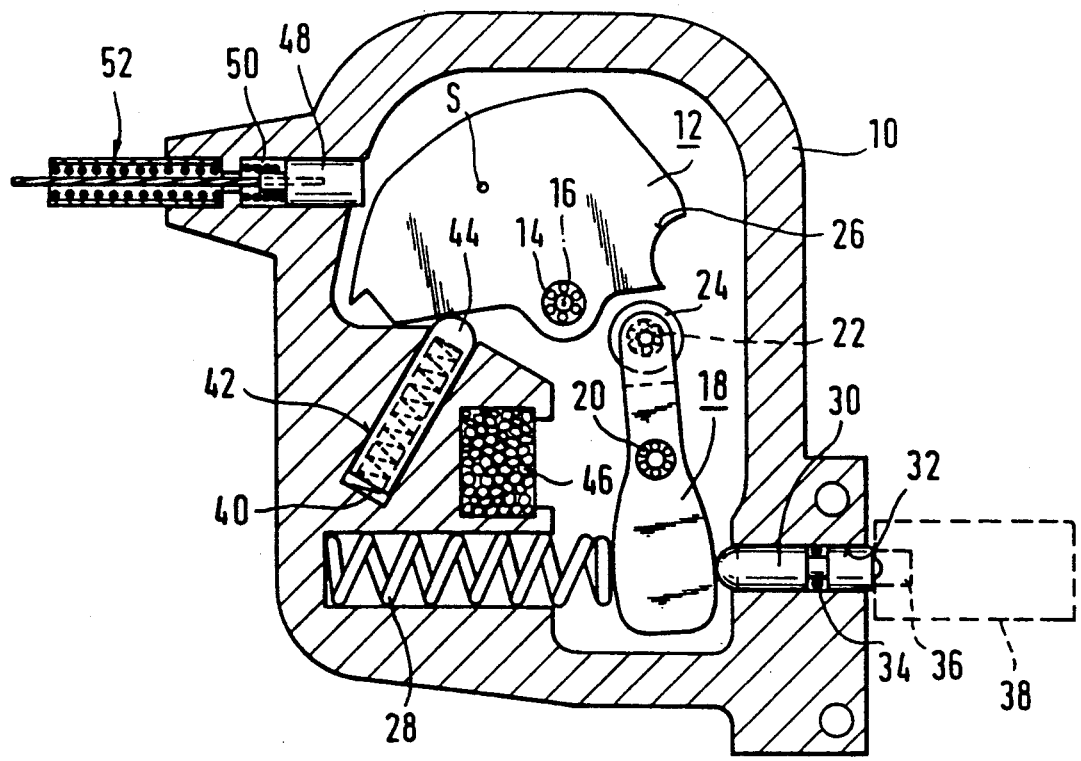
FIG. 2 is a sectional view of the same control mechanism in the triggered state.

In the embodiment of the control mechanism shown in FIGS. 1 and 2, in an outwardly hermetically sealed housing 10 a vehicle-sensitive inertia mass 12 is mounted for easy pivotal movement about an axis 16 on a rolling bearing 14. The center of gravity S of the inertia mass 12 lies in the installed condition of the housing 10 at least approximately vertically above the axis 16 in order to largely eliminate influences due to shocks acting in the vertical direction. Furthermore, in the housing 10 a strike piece 18 in the form of a two-armed lever is pivotally mounted by means of a rolling bearing 20. The strike piece 18 is provided at the free end of its lever arm facing the inertia mass 12 with a roller 24 mounted for easy rotatable movement on a rolling bearer 22. Said roller 24 bears at its periphery on a curve surface or cam face 26 of the inertia mass 12. The other lever arm of the strike piece 18 is urged by a pressure spring 28 in the direction towards a firing pin 30 which is displaceably mounted in a bore 32 of the housing 10, the sealing of the housing 10 being ensured by an 0-ring 34. The firing pin 30 projects into the interior of the housing 10. In the embodiment illustrated here it cooperates with the impact igniter 36 of a pyrotechnical gas generator 38 which in turn is provided for activation of a tightening means (not shown). In the embodiment shown the inertia mass 12 is subjected to the action of a return spring 40 which is accommodated in a bore 42 of the housing 10 and presses on a push member 44 which bears with a rounded head piece on the face of the inertia mass 12 opposite thereto. A moisture-absorbing hygroscopic substance 46 is arranged in a recess in the interior of the housing 10. In the state shown in FIG. 1 the inertia mass 12 is in a stable readiness position in which it is held by a slide 48 which is guided in a bore 50 of the housing 10 and actuated via a sheathed cable 52. The arresting of the inertia mass 12 in its readiness position under the action of the slide 50 is effective only in specific operating states. For example, the drive mechanism shown in FIG. 1 can be arranged directly on a vehicle seat for driving a tightening means integrated into the seat. On seat adjustment, the possibility of jolts of considerable intensity cannot be excluded. If the slide 50 is coupled via the sheathed cable 52 to the seat adjusting lever, the inertia mass 12 can be secured in its readiness position to permit seat adjustment without any danger of unintentional triggering of the tightening means. Steps for hermetic sealing towards the outside are also taken in the region of the introduction of the sheathed cable 52 into the housing 10.

When the slide 48, as shown in FIG. 2, releases the inertia mass 12, the latter nevertheless remains in its stable readiness position because the cam face 26 on which the roller 24 bears has such an inclination with respect to the force of the spring 28 deflected and translated by the strike piece 18 that the inertia mass 12 tends to pivot clockwise (in FIG. 1). This tendency can be further assisted by the spring 40. However, pivoting of the inertia mass 12 clockwise is not possible because the cam face 26 has a steep end limitation, the face of which is directed transversely of the longitudinal axis of the strike piece 18.

Now, when under the action of a vehicle deceleration inertial forces act on the center of gravity S of the inertia mass as indicated in FIG. 1 by an arrow F, and if these inertial forces exceed a predetermined value, the inertia mass 12 begins to pivot against the action of the spring 40 and the spring 28 anticlockwise, the roller 24 rolling on the cam face 26 against almost constant resistance. If the deceleration forces last until a predetermined velocity loss has occurred, then the roller 24 moves on the cam face 26 up to an end point of said cam face at which the latter forms an abrupt jump back in the direction of the axis 16. An overcenter effect then occurs in that the roller 24 is suddenly released and the strike piece 18 is accelerated by the spring 28 without any obstruction. The fairly strongly dimensioned spring 28 accelerates the strike piece 18 along a pivot path of a few angular degrees to such an extent that said piece strikes with high kinetic energy against the firing pin 30 and drives the latter into the impact igniter 36 of the pyrotechnical gas generator 38.

If, however, during this operation the deceleration forces drop below the predetermined value, the roller 24 will then roll back along the curve face 26 in the direction of the stable readiness position.

In the embodiment of the drive mechanism described, a specific threshold value, which must be overcome before the rolling movement of the roller 24 on the cam face 26 starts, is defined by the presence of the spring 40 and the steepness of the cam face. However, such a spring can be dispensed with if the cam face 26 is configured in a suitable manner.

In the embodiment according to FIGS. 1 and 2 the inertia mass 2 forms at the same time a release or trigger element, thereby obtaining a compact construction of the entire drive mechanism. However, with this embodiment the alignment of the housing 10 in space is defined within narrow limits.

Figure 3:
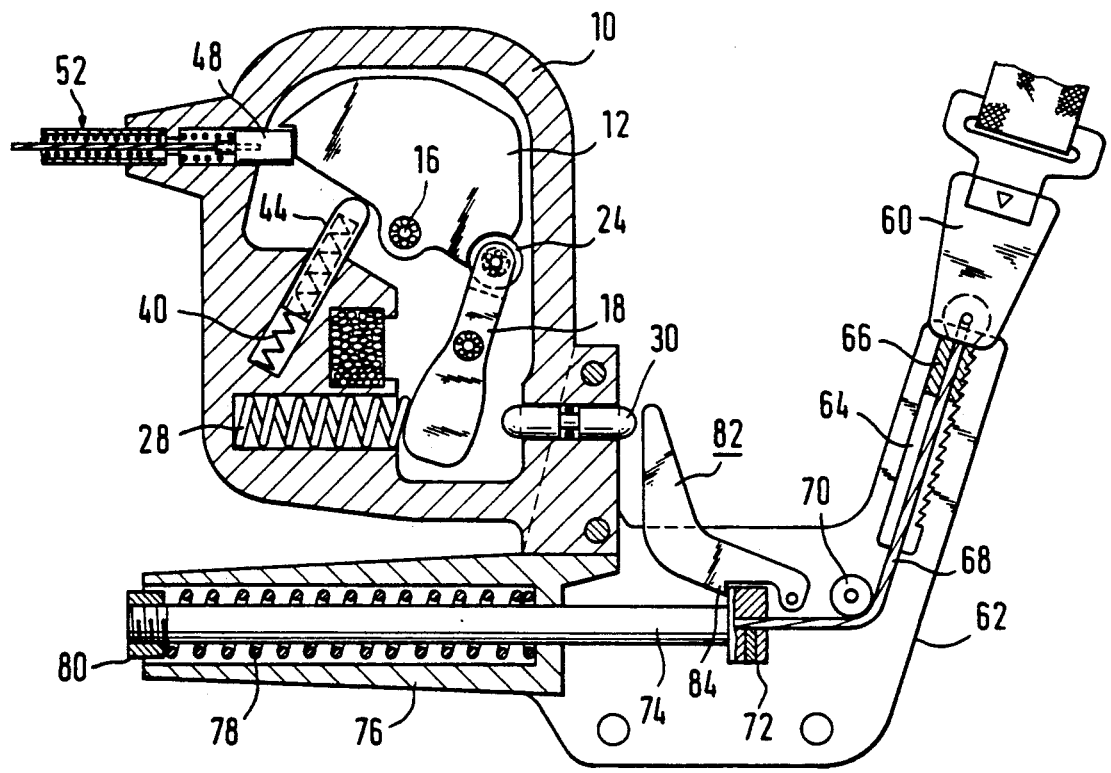
FIG. 3 is a section of a second embodiment of the control mechanism in the readiness state.

In the embodiment shown in FIG. 3 the drive mechanism, according to FIGS. 1 and 2, is associated with a purely mechanically operating tightening means. To simplify the illustration, this mechanical tightening means is shown to a different scale than the drive mechanism. It is constructionally formed so that it can be integrated into a vehicle seat. It is a so-called lock tightener in which the belt lock in the event of tightening is moved a certain distance downwards in the direction of the vehicle floor. The belt lock 60 is guided for this purpose on a mounting plate 62 which is secured to the vehicle seat and has a guide slot 64 for the belt lock 60. The guide slot 64 is provided on one side with a blocking toothing which as return blocking mechanism cooperates with a corresponding toothing on a guide piece 66 to which the belt lock 60 is secured. The one end of a sheathed cable 68 engages the belt lock 60. The other end of the sheathed cable 62 is led over a deflection pulley 70 and secured to a head piece 72 at the end of a rod 74. The rod extends through a cylinder 76 in which a strongly dimensioned pressure spring 78 is accommodated in tensioned state. The pressure spring 78 bears with its one end on the bottom of the cylinder 76 and its other end on a screwed-on headpiece 80 at the free end of the rod 74. The pressure spring 78 thus tends to move the rod 74 to the left in FIG. 3. However, the rod 74 is held in the readiness position shown in FIG. 3 by a blocking lever 82 which is pivotally mounted at its one end on the mounting plate 62, engages behind the head piece 72 with an arresting nose 84 and with its angled free end lies opposite and slightly spaced from the outer end of the firing pin 30. It is readily apparent that the firing pin 30, on striking the end of said blocking lever 82, pivots the latter clockwise so that it releases the head piece 72, whereupon the pressure spring 78 moves the rod 74 to the left in the drawing through the actuating distance provided, the belt lock 60 thereby being moved downwardly via the sheathed cable 68 and the safety belt being tightened.

Figure 4:
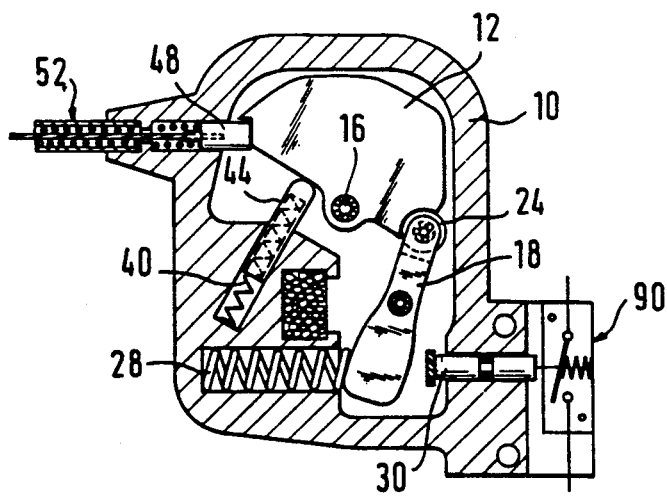
FIG. 4 is a section of a third embodiment of the control mechanism.

In the embodiment shown in FIG. 4 the firing pin 30 of the drive mechanism is provided for actuating an electrical switch 90 which is only schematically illustrated in FIG. 4 because a great variety of switch constructions is possible. Via this switch 90 any desired safety function may be initiated.

In both embodiments, by the hermetic sealing of the housing 10 in conjunction with the moisture-absorbing action of the hygroscopic substance 46, a high long-time constancy of the setting of the triggering criteria is achieved. The easy moving and precise mounting of all the critical functional parts thus cannot be impaired by any kind of soiling, corrosion or the like.

Figure 5:
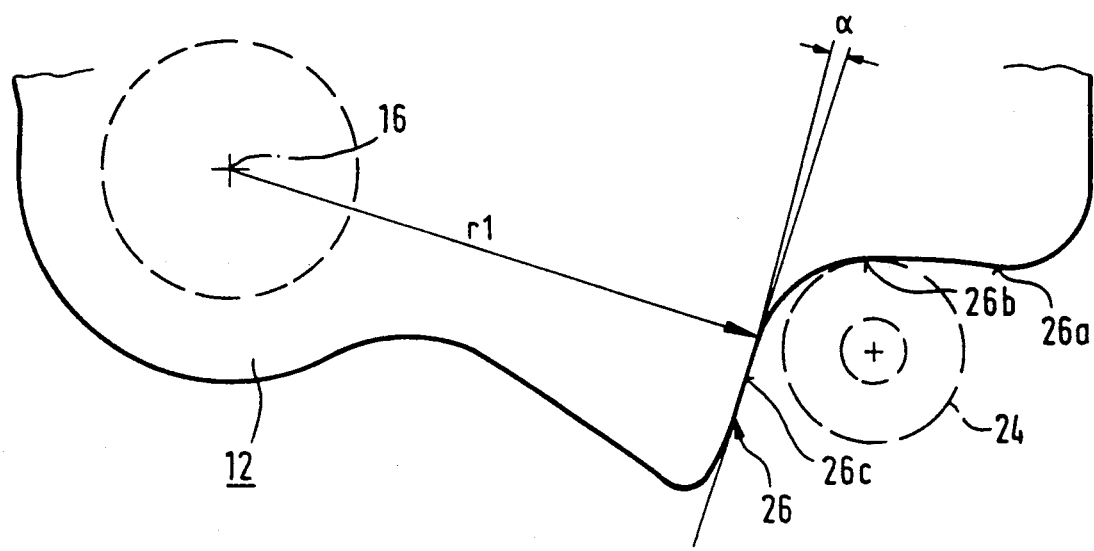
FIG. 5 is an enlarged schematic illustration of a control curve or cam on the trigger element of the control mechanism.
Figure 6:
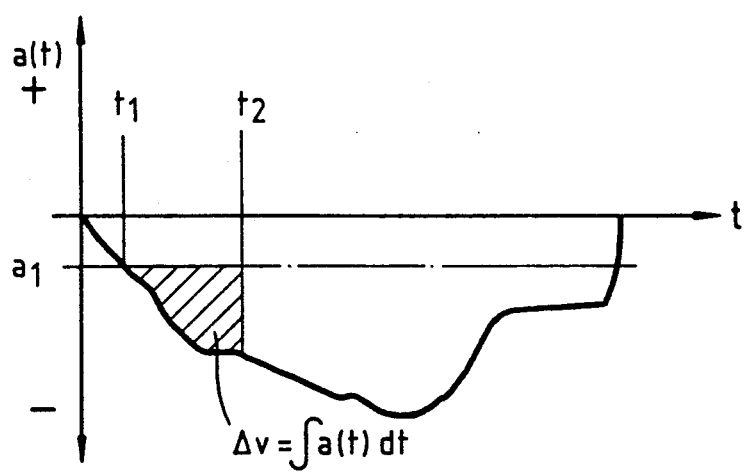
FIG. 6 is a diagram showing a typical crash curve.

With reference to FIGS. 5 and 6 details will now be explained regarding the configuration of the cam face 26 with regard to the setting of the desired triggering behaviour.

FIG. 5 shows to an enlarged scale the part of the inertia mass 12 on which the cam face 26 is formed. Said cam face 26 comprises at one end an end limit 26a for the roller 24. This end limit 26a is followed by a concave portion 26b of the cam face. Substantially from a point onwards which is defined by a radius r1 with respect to the pivot axis 16 of the inertia mass 12, the cam face merges into a portion 26c which is defined by an archimedian spiral. In every point of the cam face along this portion 26c said face forms with a tangent to the circle of corresponding radius an angle $\alpha$ of substantially the same magnitude. It should be remembered that at any point of an archimedian spiral the radius vector and polar angle are proportional to each other. A uniform rotation of the inertia mass 12 about its axis 16 therefore produces on the portion 26c of the cam face a uniform movement of the roller 24 in the radial direction. The roller 24 therefore runs on the cam face 26 against a gradually but weakly increasing resistance when the inertia mass 12 rotates anticlockwise under the action of increasing decelerations. The inclination, present at each point of the cam face 26, to a tangent to the circle with corresponding radius has, however, the effect that the roller 24 tends to roll back to its stable initial position as soon as the inertial forces acting at the center of gravity of the inertia mass decrease.

It is only when the roller 24 has reached the end of the portion 26c of the cam face that an over-center effect occurs because the cam face moves away from the roller and enables the pivot movement thereof accelerated by the spring 28.

FIG. 6 shows in simplified form a typical "crash curve", i.e. the time variation of the deceleration values occurring in a vehicle crash. Up to an instant $t_1$ the deceleration remains in magnitude beneath a value $a_1$. It is only from this deceleration value $a_1$ onwards that the inertia mass 12 should start its pivot movement under the action of the corresponding inertial forces. This deceleration value $a_1$ is set by the steepness of the cam face 26 and possibly by the spring 40 (FIGS. 1, 2). The pivot movement of the inertia mass 12 anticlockwise lasts as long as the deceleration value $a_1$ is exceeded in magnitude. If the deceleration drops below the value $a_1$, the pivot movement of the inertia mass 12 takes place in the opposite direction. However, if the magnitude of the deceleration remains above the value $a_1$ up to an instant $t_2$, a predetermined velocity loss $\Delta v$ has then occurred and the inertia mass 12 is pivoted until it moves beyond its over-center position. This velocity loss $\Delta v$ is the value of the integral with respect to time of the deceleration exceeding the predetermined value $a_1$. It is typically between 0.5 and 1.0 m/sec, depending on the vehicle type.

During the rolling movement of the roller 24 on the portion 26c of the cam face only a very small pivot movement of the strike piece 18 occurs. The roller 24 is therefore pressed with approximately constant force by the spring 28 against the cam face. Due to the inclination of the cam face this almost constant application pressure is converted to a likewise almost constant return force which tends to pivot the inertia mass 12 back to its rest position. However, as soon as and for as long as the inertial forces engaging the center of gravity S of the inertia mass 12 overcome this return force, the inertia mass will be pivoted anticlockwise.

In the embodiments described above it is assumed that the control cam is formed on the inertia mass or the trigger element and the roller is mounted on the strike piece. Fundamentally, the control cam can also be formed on the strike piece and the roller mounted on the trigger element.

I claim:

1. A control mechanism for a pretensioner of a safety belt restraining system or for a gas-bag restraining system in a vehicle, comprising a vehicle-sensitive inertia mass movably mounted in a housing and a release member pivotally mounted in said housing and bearing via a roller on a concave cam force of said inertia mass, said housing being hermetically sealed, and said release member being spring biased to hold said roller in said concave cam face and to maintain said inertia mass in a stable position, said inertia mass being arrestable in its stable readiness position by a securing element movably mounted in or on said housing and being actuatable from the outside of said housing through a housing opening, said housing opening being sealed towards the outside.

2. A control mechanism for a pretensioner of a safety belt restraining system or for a gas-bag restraining system in a vehicles, comprising a vehicle-sensitive inertia mass movably mounted in a housing and a release member pivotally mounted in said housing and bearing via a roller on a concave cam face of said inertia mass, said housing being hermetically sealed, and said release member being spring biased to hold said roller in said concave cam face and to maintain said inertia mass in a stable position, said inertia mass, said release member and said roller each being mounted via a roller bearing.

3. A control mechanism for a pretensioner of a safety belt restraining system or for a gas-bag restraining system in a vehicle, comprising a vehicle-sensitive inertia mass movably mounted in a housing and a release number pivotally mounted in said housing and bearing via a roller on a concave cam face of said inertia mass, said housing being hermetically sealed, and said release member being spring biased to hold said roller in said concave cam face and to maintain said inertia mass in a stable position, the shape of said concave cam face, the trajectory of said roller upon pivotal movement of said release member and the direction of movement of said inertia mass being selected so that:
(i) said release member is held n a stable readiness position when deceleration forces do not exceed a predetermined deceleration value at said inertia mass;
(ii) said roller rolls on the cam face of said inertia mass in a first direction against the action of the spring bias of said release member when deceleration forces exceeding said predetermined deceleration value occur at said inertia mass, and when the deceleration forces decrease said release member returns to its stable readiness position with said roller rolling on said cam face in a second direction opposite said first direction;
(iii) under the action of deceleration forces at the inertia mass having a magnitude exceeding said predetermined deceleration value and corresponding to a predetermined velocity loss, said roller on said cam face moves past an over-center point to suddenly disengage said release member from said inertia mass; and
(iv) said cam face providing an integrating function wherein deceleration is integrated with respect to time and only deceleration values exceeding said predetermined value are integrated, said release member being disengaged from said inertia mass only when the integral of deceleration equals said predetermined velocity loss.

* * * * *

UNITED STATES PATENT AND TRADEMARK OFFICE
CERTIFICATE OF CORRECTION

PATENT NO. : 5,149,128
DATED : September 22, 1992
INVENTOR(S) : Artur Fohl

It is certified that error appears in the above-identified patent and that said Letters Patent is hereby corrected as shown below:

Column 6, Line 44, Claim 1, change "force" to --face--.

Column 7, Lines 1 and 2 Claim 3, change "number" to --member--.

Column 7, Line 12, Claim 3, change "n" to --in--.

Signed and Sealed this

Twelfth Day of October, 1993

Attest:

BRUCE LEHMAN

*Attesting Officer*      *Commissioner of Patents and Trademarks*